Patented July 11, 1944

2,353,251

UNITED STATES PATENT OFFICE 2,353,251

FRUIT SIRUP

Victor Charles Emile Le Gloahec, Rockland, Maine, assignor to Algin Corporation of America, New York, N. Y., a corporation of Delaware No Drawing. Application December 15, 1941, Serial No. 423,043

3 Claims. (Cl. 99—102)

This invention relates to fruit sirup and the manufacture thereof and relates especially to fruit sirup of the type which containes pieces of fruit.

Fruit sirups containing pieces of fruit in an aqueous medium are commonly used to pour over ice cream, cake, etc. It is important that a fruit sirup containing pieces of fruit should remain liquid so that it can be poured. However, when pieces of fruit are disposed in a sugar sirup containing sufficient sugar to sweeten the fruit to the extent demanded by the public, the fruit tends to rise to the surface of the sirup in a flocculate or floating condition leaving an underlying layer of more or less clear sirup medium. The collection of the fruit at the surface of the sirup renders the sirup much less desirable and saleable.

It has heretofore been proposed by confectioners and other manufacturers of fruit sirup, to remedy the difficulty of the fruit rising to the surface of a sugar sirup by using pectin to jellify the sirup in which the pieces of fruit are suspended, thereby thickening the medium in which the pieces of fruit are suspended by a jellifying action. Pectin, of course, in aqueous solution does not jellify but does form a gel in fruit sirup due to the acidic action of the fruit. The use of pectin has the disadvantage, however, that it tends to make the product resemble a jelly rather than a sirup. Moreover, pieces of fruit in the sugar solution containing pectin tend to surround themselves with an excessively jellified coating of pectin. The occurrence of a jellified coating on and about the pieces of fruit is not desirable.

Gelatin also has a jellifying action but does not have this action in the presence of acid fruit. Therefore gelatin is not suitable.

It is a purpose of this invention to overcome the difficulties hereinabove mentioned and to produce a fruit sirup in which pieces of fruit are contained in an aqueous medium wherein the fruit does not tend to rise excessively and wherein there is no objectionable jellifying action.

According to the present invention, the foregoing difficulties are overcome by using algin as a thickening agent for a fruit sirup containing pieces of fruit. Algin is a complex organic substance contained in various seaweeds such as Laminaria, Phaeophyceae, Macrocystis, Nereocystis and the like. Algin may be recovered from seaweed in several different ways and may, for example, be recovered in a high state of purity according to the method described in Patent No. 2,128,551, applied for by the applicant jointly with John Robert Herter. Algin is also referred to as alginous material. Pure algin is soluble in distilled water but is precipitated if sufficient acid is added to an algin solution. By adding an alkali, precipitated algin can be dissolved. I will refer herein to the material in question by the term "algin," which is the term most generally used in the art.

While algin becomes coagulated by acid, the acidity of fruit is not sufficient to coagulate the algin. The isoelectric point of pure algin is at a pH of about 3 or slightly lower which is definitely on the acid side and this accounts for the fact that algin may be used without coagulation in the presence of the mild acidity of fruit. If algin is impure the algin may coagulate at a pH above the isoelectric point of pure algin and for this reason it is desirable in the practice of this invention not to use algin that is excessively impure.

The use of algin as a thickening agent for a sirup containing pieces of fruit has several advantages. In the first place the algin thickens the sirup to any extent desired without producing a jelly. The thickening of the sirup is such that the tendency of the pieces of fruit to rise therein is greatly retarded or even prevented altogether. As aforesaid, this is accomplished without producing any unnatural coating of jelly or the like about the pieces of fruit. Moreover, the thickening of the sirup while preserving the natural appearance of the fruit, gives the sirup a more attractive consistency.

Another advantage of the use of algin is that it has an adsorptive effect on acid contained in fruit, thus reducing the tartness of fruit and tending to bring out the flavor of fruit in a desirable manner. The fact that the algin has an adsorptive effect on the acid of fruit enables fruit sirup to be prepared to required sweetness using less sugar than when algin is not used. Sugar acts partly to reduce the acidity of fruit and partly to sweeten the sirup and when algin is present to reduce the acidity of the fruit less sugar is necessary. The use of algin according to this invention therefore enables the fruit sirup having desired sweetness and consistency to be made more economically. Moreover, by the use of algin, it is possible to cut down the amount of sugar that is used in the sirup until the aqueous medium containing the pieces of fruit has approximately the same specific gravity as the pieces of fruit suspended therein. Under such conditions, the fruit sirup has very great stability from the point of view of prevention of the pieces of fruit from rising to the surface of the sirup. A further advantage of algin is that it does not adversely affect the taste, color, or assimilability of the fruit sirup.

It may also be mentioned that when pieces of fruit are immersed in a sirup of sugar or even in a sugar sirup containing pectin, the pieces of fruit tend to lose their shape by shrivelling and allowing a portion of the fruit liquid to pass through the fruit from the interior of the fruit to the sirupy medium on the exterior. When the sirup contains algin, this disadvantageous phenomenon does not take place, inasmuch as the algin alters the osmotic pressure of the sirup medium so as to minimize the phenomenon of exosmosis which occurs when there is no sirup in the medium; and the algin may create the reverse phenomenon of endosmosis if used in sufficient amount, e. g., in the amounts mentioned below by way of example.

While fruit sirup ordinarily contains sugar as a sweetening and preserving agent, the presence of sugar is not essential in the practice of this invention. Thus fruit sirups can be made using algin as a thickening agent that do not contain sugar, and it is to be understood that the term "sirup" is used broadly herein as covering products of a sirupy consistency whether or not they contain sugar or the like. Saccharine may be used as a sweetening agent. Moreover, when reference is made to pieces of fruit, the fruit may be in whole condition, e. g., whole strawberries, raspberries, blackberries, blueberries, etc., or may be fruit that has been subdivided, such as cut-up pineapples, peaches, pears, apples, etc.

This invention is applicable in connection with sirups containing any kind of fruit such as strawberries, pineapples, cherries, peaches, and the like. In carrying out the invention, all that is necessary is to add sufficient algin to bring about the amount of thickening that is desired. In this connection, it may be mentioned that only relatively small amounts of algin are required to bring about a desired thickening action. Thus, a sugar solution which contains twenty pounds of sugar per gallon and which has a viscosity of about 160 centipoises at 50° C. without the algin, by addition of ½ pound per gallon of algin of the character described in Patent No. 2,128,551 will have its viscosity increased to about 5500 centipoises at the same temperature. Usually it is desirable to add enough algin so that the viscosity of the aqueous medium in which the fruit is suspended will be at least about 2000 centipoises, although this is not necessary in the practice of this invention.

The following is a typical example of the practice of this invention. Two pounds of algin are dissolved in 15 gallons of water, and, after the algin is dissolved, 300 pounds of sugar are dissolved in the water. This solution is brought to the boiling point and is added to a mixture of 40 pounds of pieces of fruit and 10 pounds of sugar and intermingled therewith. The resulting product is one wherein the algin acts as a thickening agent and wherein the proportion of sugar is adjusted so that the specific gravity of the aqueous medium is approximately the same as that of the fruit. The pieces of fruit therefore occur in a condition of very stable suspension and will not rise to the surface over periods of prolonged standing.

Instead of cane sugar or corn sugar, one may also use other sugar or sugar equivalents. In this connection, the word "sugar" is used in a broad sense as covering both normal sugars and invert sugars such as glucose. However, when a material such as glucose is used, it is recommended that there be used in addition to the algin a buffer, preferably any water-soluble salt of an organic acid that is present in a free state in the fruit, e. g., sodium citrate or sodium tartrate, inasmuch as glucose has a tendency to jellify the algin due to traces of metallic salts, particularly of calcium salts, which constitute impurities in commercial glucose. Thus, for example, one may use equal parts of algin and sodium citrate when algin is used as a thickening agent for a fruit containing glucose. Of course, a buffer of the character mentioned can be employed whenever any such impurities occur in glucose or other sugar or in any ingredient of the fruit sirup.

It is apparent, of course, that the practice of this invention as above exemplified may be varied without departing from the scope of this invention as defined by the language of the following claims.

I claim:

1. A fruit-containing sirup comprising pieces of fruit in an aqueous medium containing sugar and containing algin as a thickening agent.

2. A fruit-containing sirup comprising pieces of fruit in an aqueous medium containing sugar and containing algin as a thickening agent, the specific gravity of said medium being approximately the same as the specific gravity of the fruit.

3. A fruit-containing sirup comprising pieces of fruit in an aqueous medium containing glucose and sodium citrate, and containing algin as a thickening agent.

VICTOR CHARLES EMILE LE GLOAHEC.